(12) United States Patent
Grace

(10) Patent No.: US 7,021,632 B2
(45) Date of Patent: Apr. 4, 2006

(54) SELF-ENERGIZED GASKET AND MANUFACTURING METHOD THEREFOR

(75) Inventor: Ronald L. Grace, Fallbrook, CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 10/793,261

(22) Filed: Mar. 4, 2004

(65) Prior Publication Data

US 2005/0194746 A1    Sep. 8, 2005

(51) Int. Cl.
*F16J 15/34* (2006.01)
*F16J 15/02* (2006.01)

(52) U.S. Cl. .................. 277/395; 277/438; 277/530; 277/537; 277/539; 277/567; 277/626; 277/647; 277/650; 156/196

(58) Field of Classification Search ............... 277/924, 277/395, 438, 530, 539, 534, 537, 567, 626–627, 277/647, 650; 156/196, 212–213
See application file for complete search history.

(56) References Cited

U.S. PATENT DOCUMENTS

| | | | |
|---|---|---|---|
| 859,253 A * | 7/1907 | Restein | 428/102 |
| 885,405 A * | 4/1908 | Trist | 277/530 |
| 1,466,087 A | 8/1923 | Christenson | |
| 1,924,555 A | 8/1933 | Hubbard | |
| 1,942,705 A | 1/1934 | Hubbard et al. | |
| 1,969,008 A | 8/1934 | Hubbard | |
| 2,053,363 A | 9/1936 | Davies | |
| 2,218,638 A | 10/1940 | Christenson | |
| 2,342,458 A * | 2/1944 | Davies | 277/530 |
| 2,525,747 A | 10/1950 | Hess | |
| 2,533,742 A | 12/1950 | Poltorak | |
| 2,538,198 A * | 1/1951 | Hosford | 277/572 |
| 2,676,823 A | 4/1954 | Olson et al. | |
| 3,013,830 A | 12/1961 | Milligan | |
| 3,655,206 A | 4/1972 | Adams | |
| 3,807,742 A | 4/1974 | Hershey | |
| 4,116,451 A | 9/1978 | Nixon et al. | |
| 4,214,761 A | 7/1980 | Pippert | |
| 4,364,571 A | 12/1982 | Hershey | |
| 4,892,320 A | 1/1990 | Tückmantel | |
| 5,308,090 A | 5/1994 | Hamada et al. | |
| 5,484,342 A * | 1/1996 | Beck | 474/254 |
| 5,522,603 A | 6/1996 | Naitou et al. | |

(Continued)

OTHER PUBLICATIONS

Helicoflex, a Division of Garlock Sealing Technologies, brochure "*HELICOFLEX® Spring Energized Seals, High temp metal O and C rings that require high bolt loads*" (4 pages).

*Primary Examiner*—Vishal Patel
(74) *Attorney, Agent, or Firm*—Flynn, Thiel, Boutell & Tanis, P.C.

(57) ABSTRACT

A secondary seal gasket is formed of a graphite material for higher temperature applications. The gasket is formed by multiple wraps of a graphite ribbon and then is shaped in a mold to provide a U-shaped cross-sectional configuration having a self-energizing spring disposed therein. The gasket is formed from an L-shaped ribbon wrap having additional ribbon overwraps thereon to define a gasket ring which is then molded in a die press to form the U-shape. The L-shaped ribbon wrap thereby extends axially and then radially outwardly to define an end wall of the gasket to impede migration of fluid between the axial ribbon wraps.

34 Claims, 5 Drawing Sheets

U.S. PATENT DOCUMENTS

| | | |
|---|---|---|
| 5,573,253 A | 11/1996 | Naitou et al. |
| 5,683,091 A | 11/1997 | Isoe et al. |
| 5,803,464 A | 9/1998 | Ueda et al. |
| 5,979,904 A | 11/1999 | Balsells |
| 5,984,316 A | 11/1999 | Balsells |
| 5,994,856 A | 11/1999 | Menegoli |
| 6,050,572 A | 4/2000 | Balsells et al. |
| 6,161,838 A | 12/2000 | Balsells |
| 6,318,907 B1 * | 11/2001 | Schroeder et al. ............ 385/88 |
| 6,679,524 B1 * | 1/2004 | Greib et al. ............. 280/801.1 |

* cited by examiner

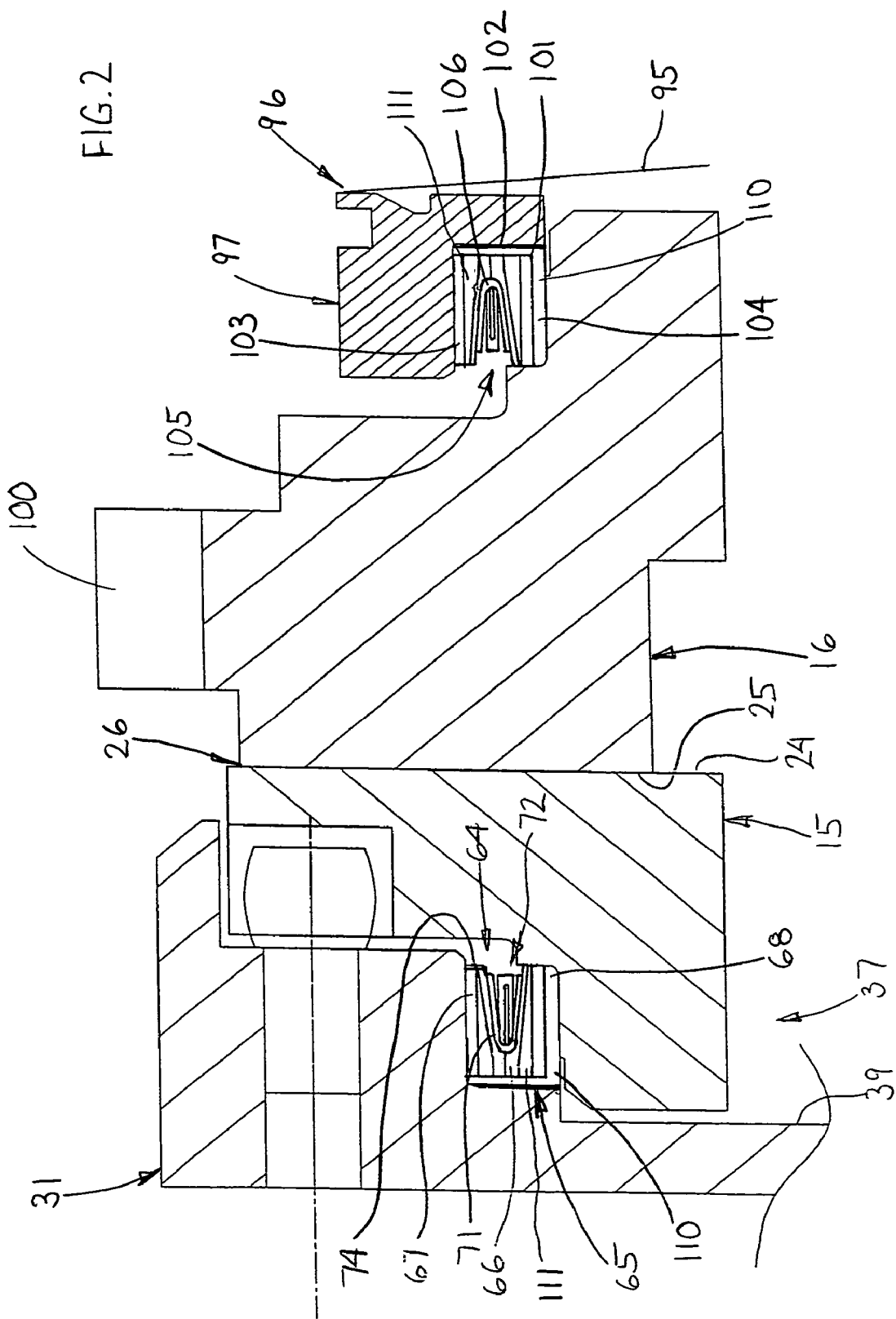

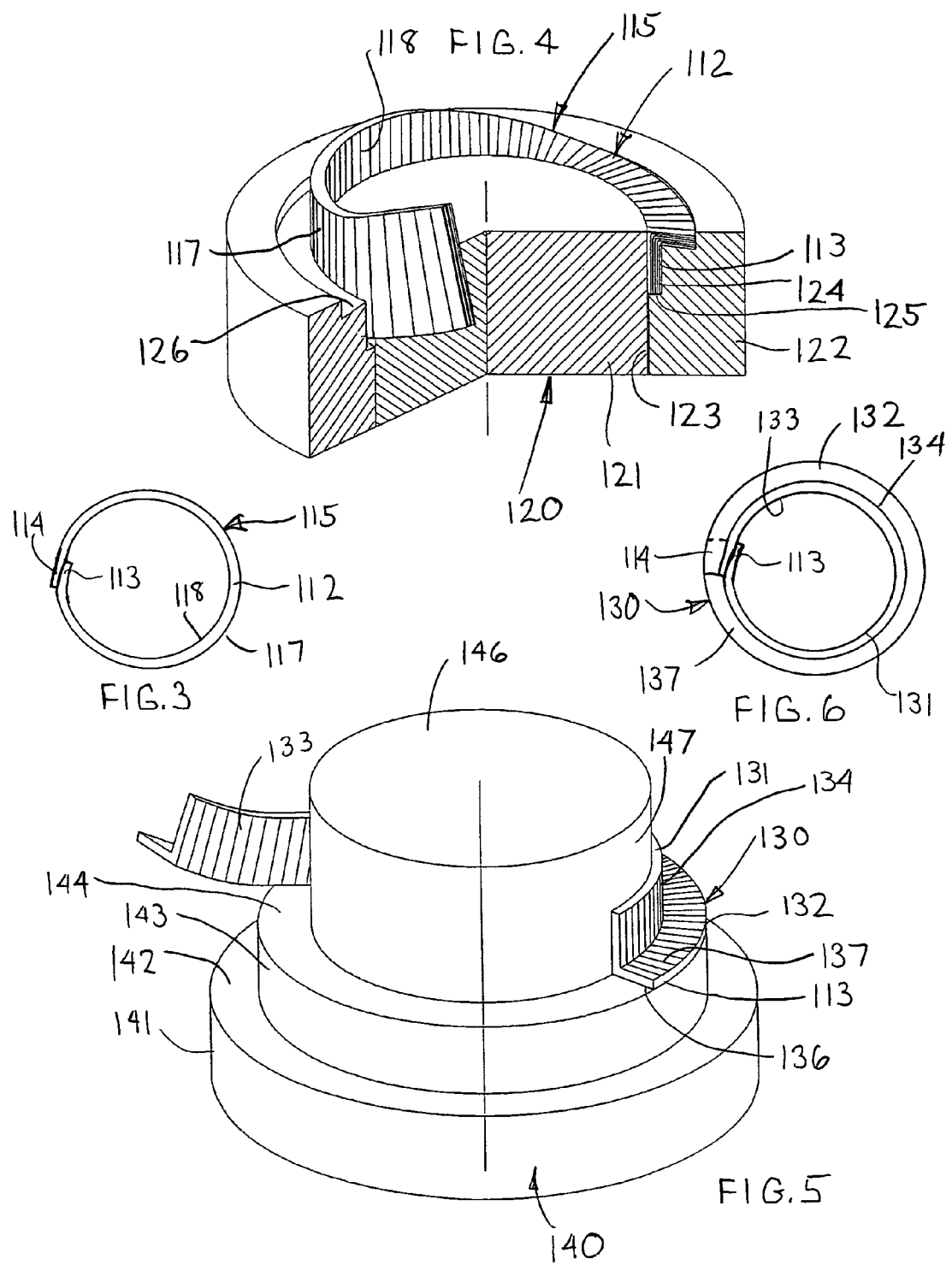

SELF-ENERGIZED GASKET AND MANUFACTURING METHOD THEREFOR

FIELD OF THE INVENTION

The invention relates to a secondary seal gasket for a mechanical seal, and more particularly, to a shaped graphite gasket which is self-energized and particularly adapted for higher temperature applications.

BACKGROUND OF THE INVENTION

Mechanical face seals are used on various types of machines and equipment, such as pumps, compressors, and turbines which have a rotating shaft and a sealing chamber adjacent the shaft wherein the mechanical seal prevents leakage of fluid from the sealing chamber. Many such mechanical seals include a pair of adjacent seal rings which have opposing seal faces that define a sealing region therebetween to sealingly separate the sealing chamber from an exterior region. Typically, one of the seal rings is mounted on the shaft so as to rotate therewith while the other stationary seal ring is non-rotatably mounted on a seal housing.

Also, at least one of the rotating and stationary seal rings is axially movable. To maintain a seal between the opposed seal faces, the axially movable seal ring is axially loaded, such as by a spring or bellows, towards the other seal ring.

While the sealing region between the relatively rotatable seal faces defines the primary seal, secondary seals are provided between other adjacent components in the mechanical seal. For example, a secondary seal between the rotatable seal ring and the shaft or a shaft sleeve prevents migration of the sealed fluid therebetween, while a secondary seal between the stationary seal ring and a support element therefor prevents migration of the sealed fluid between these components.

As to such secondary seals, U.S. Pat. No. 5,813,674 defines a non-bellows seal arrangement wherein a secondary seal between a seal ring and a seal ring holder is a gasket which has a C-shaped cross section and a spring disposed within the gasket. Another seal arrangement having a spring energized plastic seal is disclosed in U.S. Pat. No. 6,116,610. However, these spring energized secondary seals can slide axially and thus, do not support the axial loads between the spring and the seal ring.

An inventive mechanical seal having an improved secondary seal arrangement overcomes disadvantages associated with known mechanical seals and is disclosed in U.S. Pat. No. 6,464,231 (Burroughs). The '231 patent is owned by the assignee of the present application, namely, Flowserve.

The gasket of the '231 patent relates to a mechanical seal having a spring loaded secondary seal which resiliently permits relative radial movement between a seal ring and a support element therefor, such as a bellows flange, and also supports axial loads between the seal ring and the support element.

In particular, a bellows type mechanical seal is provided wherein a non-rotatable, i.e. stationary, seal ring is axially movable and is axially loaded by a bellows which connects the stationary seal ring to the seal housing. The bellows includes a bellows flange at one end thereof which defines a support element that seats the stationary seal ring therein and has a secondary seal gasket therebetween. The opposite end of the bellows includes an annular adapter which seats within the seal housing and also has a secondary seal gasket therebetween. A further secondary seal gasket is provided between the rotatable seal ring and a support element therefor, namely a shaft sleeve.

The secondary seal gasket of the '231 patent is an annular gasket having a C-shaped cross sectional shape defined by upper and lower legs and an end wall. The upper and lower legs and the end wall define a gasket jacket in which an annular spring is received. The annular spring is disposed between the legs to press the legs radially away from each other into sealing engagement with opposed surfaces of the bellows flange and a gasket shoulder defined on the seal ring. The upper and lower gasket legs therefore can move radially relative to each other to accommodate relative radial motion between the seal ring and the support element, thus reducing seal face distortion due to vibrations, differential thermal expansion or contraction, and differential pressure expansion or contraction. Further, spring and pressure forces act on and through the gasket jacket to effectively seal and center the seal ring. The self-energized gaskets eliminate high radial forces and press fits required to seal a conventional rectangular flexible graphite gasket or high temperature metallic gasket. These extreme forces distort the seal ring lapped face.

Additionally, the lower gasket leg is confined axially between an end wall of the gasket shoulder and an opposing face of the bellows flange such that the axial loads applied on the bellows flange by the bellows are transmitted axially to the seal ring through the lower gasket leg. While the lower leg is resilient, the lower leg is constrained axially and therefore is stiff in that direction, particularly since a hydraulic pressure force between the gasket legs-stabilizes the lower leg and prevents buckling under axial loads.

The secondary seal arrangement and its application in a bellows type mechanical seal provides an improved seal having substantial axial load support while allowing radial motion of the parts which minimizes distortion of the faces and improves seal performance.

However, the gasket of the '231 patent typically is machined or formed from molded carbon filled PTFE composites or other polymer billets and typically is limited to about 500° F. during continuous duty, such as in a steam turbine seal. However, for larger steam turbines and other applications, the PTFE gasket is not suitable for higher operating temperatures such as above 800° F.

Typically, graphite is used to construct gaskets for higher temperature application. Known flexible graphite gaskets are conventionally formed from multiple wraps of a graphite ribbon material known commercially as Grafoil™. However, these gaskets have a square cross-section due to the wrapping process and conventional manufacturing techniques do not provide for a U-shaped cross-sectional shape like the gasket of the '231 patent. These square gaskets must be installed under compression or a predetermined interference to press fit. The forces required to seal this form of Grafoil gasket can cause distortion when used in conjunction with a rotating or stationary face.

The invention therefore relates to a graphite gasket which has a cross-sectional shape conforming generally to the U-shaped gaskets disclosed in the '231 patent so that the graphite gaskets disclosed herein perform the same functions while still providing a higher temperature capability which the graphite material provides. The graphite gasket of the invention is spring energized and the invention relates to the specific structure of the graphite gasket as well as the manufacturing method therefor.

Structurally, the graphite gasket is formed of multiple layers of graphite ribbon wherein a first section of the graphite ribbon is formed in a ring and then formed into an L-shape defined by an axial ribbon section which extends axially and a radial ribbon section which bends radially outwardly across the radial width of the finished gasket. The gasket also includes a second overwrap section wherein additional layers of graphite ribbon wrap are then wrapped about the axial ribbon section in a stack extending radially outwardly to the outer circumference of the radial ribbon section.

The finished gasket is provided with a U-shape defined by inner and outer axially extending legs and a radial end wall which spans the radial distance between the inner and outer legs and holds these legs together. The L-shaped graphite ribbon section extends axially along the inner gasket leg and then radially outwardly along the end wall to effectively define a barrier to fluid migration between the inner faces between the ribbon wrap.

In addition to this structural arrangement, the invention relates to the method of forming this gasket. In particular, the method comprises the steps of first wrapping Grafoil™ ribbon to provide a suitable diameter and then this initial ribbon section is formed into the L-shape. Thereafter, after forming this first ribbon section, additional overwraps of graphite ribbon are provided about the axial portion of the L-shaped section to the outermost diameter of the radial section. This provides an intermediate graphite ring having a substantially rectangular or square cross-section.

Then, this intermediate ring is molded by pressing a die axially into the end of the overwrap section to compress and shape the graphite ribbon into inner and outer gasket legs and define an interior annular groove in which a spring is seated.

The improved gasket thereby provides a graphite seal having a shaped cross-sectional configuration for use in high temperature applications. The graphite gasket may be installed into the mechanical seal disclosed in the '231 patent and thereby allows the mechanical seal of the '231 patent to be readily adapted to high temperature applications.

Other objects and purposes of the invention, and variations thereof, will be apparent upon reading the following specification and inspecting the accompanying drawings.

BRIEF DESCRIPTION OF THE DRAWINGS

FIG. 2 is an enlarged side cross sectional view of a pair of relatively rotatable seal rings.

FIG. 3 is a plan view of a starter wrap of graphite ribbon.

FIG. 4 is a perspective view in cross-section of the starter wrap being inserted into an L-shaped forming fixture for forming the starter wrap into an L-shape wrap.

FIG. 5 is a perspective view illustrating the L-shaped wrap being wrapped onto a die-forming mandrel.

FIG. 6 is a plan view of the L-shaped wrap.

Figure 1:
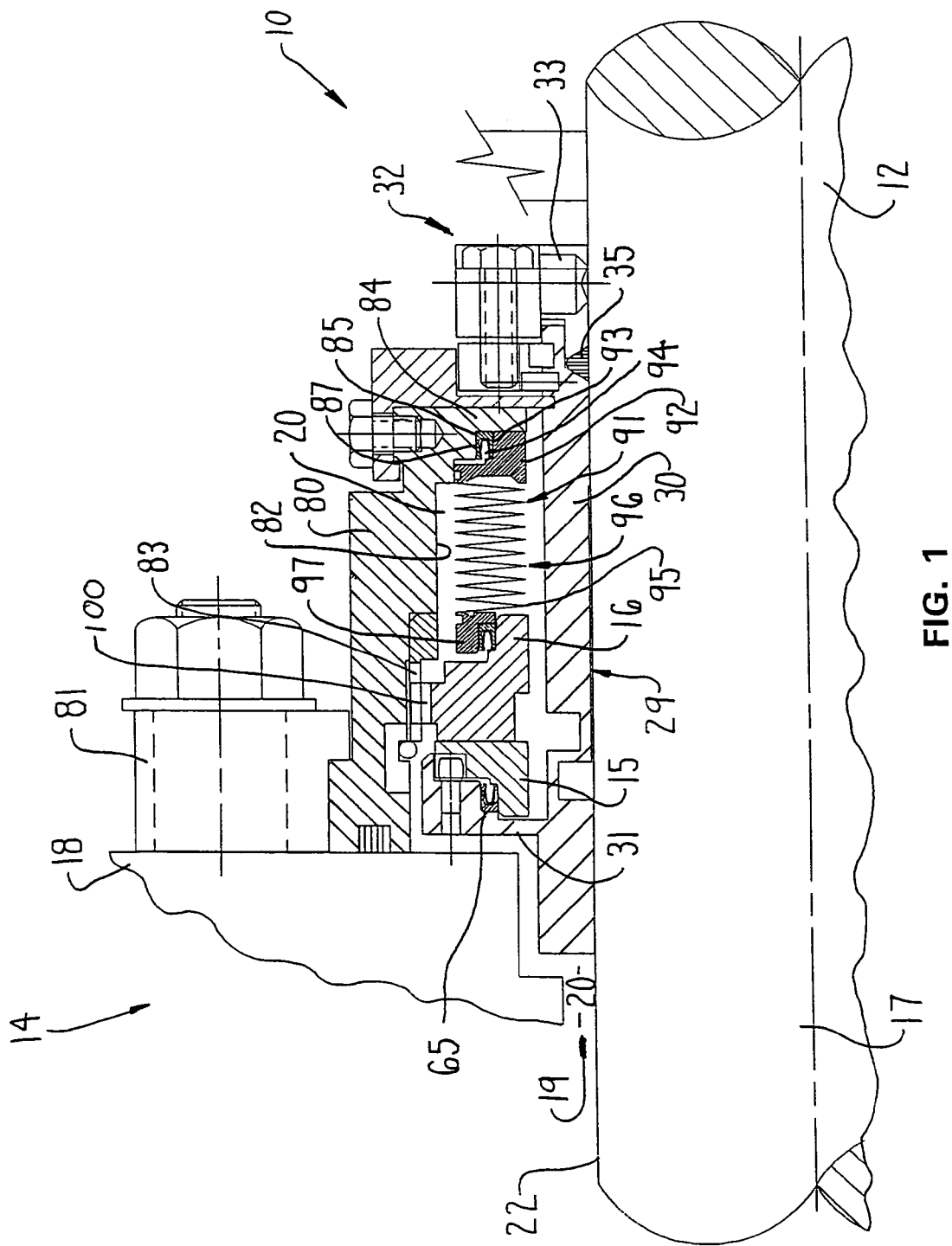
FIG. 1 is a cross sectional view of a bellows type mechanical seal of the invention which is mounted on a rotating shaft and includes an inventive graphite secondary seal arrangement.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, a bellows type mechanical face seal 10 is mounted on a rotatable shaft 12 of a machine 14. The mechanical seal 10 includes a pair of concentric, relatively rotatable seal rings 15 and 16 which effectively prevent fluid leakage along the shaft 12. The specific construction of the mechanical seal 10 is disclosed in U.S. Pat. No. 6,464,231 B2 (Burroughs), the disclosure of which is incorporated herein in its entirety by reference. The present invention relates to improved, self-energized graphite gaskets 65, 87 and 101 which are provided in the mechanical seal 10.

More particularly as to machine 14 and the mechanical seal 10 in which the gaskets 65, 87 and 101 are used, the machine 14 has a rotatable shaft therein, which said shaft 12 is rotatable about an axis 17. Examples of such equipment include pumps, compressors, turbines and the like. Further, the machine 14 includes an annular machine housing 18 which defines a seal chamber 19 that surrounds the rotating shaft 12 and confines the fluid 20 being sealed therein. The fluid 20 being sealed may be a high temperature gas, such as steam, or liquid such as a pump fluid found in the impeller chamber of a pump. It will be understood that the inventive secondary seal arrangement of the invention is adapted for use in higher temperature applications, such as in steam turbines, refinery pumps, chemical pumps and other high temperature specialty applications in rotating machinery.

The machine 14 further includes a motor which rotates the shaft 12, which shaft 12 has a conventional circular cross section defined by an outer circumferential shaft surface 22. As such, the shaft 12 rotates relative to the machine housing 18. In order to prevent leakage of the fluid 20 from the seal chamber 19, the mechanical seal 10 is connected between the machine housing 18 and the shaft 12.

More particularly as to the mechanical seal 10, the seal 10 includes the rotatable seal ring 15 which is mounted to the shaft 12 and accordingly, rotates therewith, and the stationary seal ring 16 which is non-rotatably mounted to the machine housing 18. The rotatable seal ring 15 and the stationary seal ring 16 therefore are relatively rotatable, and as seen in FIG. 2, include respective seal faces 24 and 25 which face axially toward each other in opposing relation to define a sealing region 26 therebetween. The sealing region 26 is defined radially across the seal faces 15 and 16 and prevents or at least minimizes leakage of the chamber fluid 20 through the sealing region 26 during shaft rotation.

As to the individual components of the mechanical seal 10 (FIGS. 1 and 2), a shaft sleeve 29 is mounted non-rotatably to the shaft 12. The shaft sleeve 29 concentrically surrounds the shaft 12 and has a generally L-shaped cross-section defined by a tubular shaft section 30 and an annular sleeve flange or backing flange 31 which projects radially outwardly from an inner end of the shaft section 30.

The outer end of the shaft sleeve 29 is secured on the shaft 12 by a drive collar 32 which includes set screws 33 directed radially into engagement with the outer shaft surface 22. The fluid 20 is prevented from leaking along between the shaft sleeve 29 and the shaft 12 by an annular, sleeve gasket 35 preferably made of flexible graphite.

The sleeve flange 31 of the shaft sleeve 29 projects radially outwardly to support the rotatable seal ring 15 thereon. Referring to FIG. 2, the backing flange 31 generally defines an annular, L-shaped pocket or seal ring seat 37 that corresponds to the L-shape of the seal ring 15, such that the seal ring 15 seats within the seal ring seat 37 as seen in FIG. 2.

Referring to FIG. 2, the seal 15 and the sleeve flange 31 have opposing surfaces which are radially and axially spaced apart to define an annular pocket 64 in which a secondary seal gasket 65 is received. Generally, the secondary seal 65 (FIG. 2) is an annular graphite gasket having a U-shaped or C-shaped cross section which shape is defined by a radial gasket wall or end wall 66 and upper and lower gasket legs 67 and 68 respectively which extend axially from the gasket wall 66. The graphite gaskets 65 are similar to the gasket disclosed in U.S. Pat. No. 6,464,231 B2 (Burroughs) which gaskets in practice are typically machined or formed of PTFE or other elastomeric material. The gasket 65 of the present invention, however, is formed of graphite ribbon material so as to provide a suitable construction for high temperature applications at temperatures which exceed the temperature capabilities of PTFE gaskets.

Referring to FIG. 2, the lower gasket leg 68 abuts radially inwardly against the seal ring 15 while the upper gasket leg 67 abuts radially outwardly against the sleeve flange 31 to define a radial seal therebetween and prevent leakage of the fluid 20 between the back of the seal ring 15 and the sleeve flange 31. More particularly, the upper and lower gasket legs 67 and 68 are pressed radially away from each other by an interior spring 71 which is annular and has a C-shaped or U-shaped cross section. Preferably, the spring 71 is made from elgiloy or other alloy that is corrosion resistant and can withstand high temperatures. Referring to FIG. 2, the gasket legs 67 and 68 define an annular slot 72 therebetween which opens forwardly, and the spring 71 is seated axially within the slot 72.

Since the upper and lower legs 67 and 68 are spaced radially apart and are supported radially by a spring 71 which is resiliently deflectable, this gives flexibility to the gasket legs to seal against flange 31 and seal ring 15. This minimizes undesirable radial loads from compression or press fit loads used typically to seal other forms of high temperature gaskets, which might otherwise distort the seal face 24 or compromise seal ring performance.

In addition to the foregoing, the gasket 65 is confined axially. When the sealing chamber 19 (FIG. 1) is pressurized, axial loads typically are transmitted to the rotatable seal ring 15 which is pressed toward the sleeve flange 31. However, the axial load is supported by the lower leg 68.

The hydraulic fluid pressure acts within the gasket slot 72 and thus, presses the lower leg 68 radially inwardly against the seal ring 15 and effectively stiffens the lower leg 68. This hydraulic fluid pressure thereby prevents the lower leg 68 from buckling even under significant axial loads.

The above-described gasket 65 allows relative radial movement of the sleeve flange 31 relative to the seal ring 15 and also can support significant axial loads. The same type of gasket seal is provided on the seal ring 16 to provide the same advantages as well as additional advantages which are briefly described hereinafter.

Generally as to the mounting of the stationary seal ring 16 as seen in FIG. 1, the mechanical seal 10 includes an annular seal gland or seal housing 80 which is mounted to the machine housing 18 by a mounting collar 81. The seal housing 80 surrounds the shaft sleeve 29 and the rotatable seal ring 15 mounted thereto and further surrounds the stationary seal ring 16 as described hereinafter.

More particularly, the inside surface 82 of the seal housing 80 includes circumferentially spaced apart axial ribs 83 which are disposed radially outwardly of the stationary seal ring 16 for maintaining the seal ring 16 stationary during shaft rotation. The seal housing 80 also includes an end wall 84 which projects radially inwardly toward the shaft 12, which said end wall 84 includes a gasket pocket 85. The gasket pocket 85 is formed substantially the same as the gasket pocket (FIG. 2) of the sleeve flange 31, except that the gasket pocket 85 opens in the opposite axial direction. The gasket pocket 85 includes a seat gasket 87 therein that is formed identical to the gasket 65 described above.

The seat gasket 87 cooperates with an edge welded metal bellows assembly 91 which generally connects the stationary seal ring 16 to the seal housing 80. The outermost end of the bellows assembly 91 includes an annular adapter 92 which is engaged with the end wall 84. The adapter 92 has an L-shaped cross section which generally corresponds to the L-shape of the seal ring 15, and further includes an annular gasket shoulder 93 which is identical to the gasket shoulder (FIG. 2) formed on the seal ring 15. The gasket pocket 94 (FIG. 1) includes the seat gasket 87 therein which seat gasket 87 is the same as the rotatable ring gasket 65. The seat gasket 87 thereby accommodates axial loads acting on the bellows adapter 92 by the bellows assembly 91 and also dampens radial movement of the bellows adapter 92 such as due to vibrations.

The bellows assembly 91 further includes a bellows 96 formed of a plurality of convolutions 95 that extend axially between the bellows adapter 92 and the bellows flange 97. The convolutions 95 defined are resiliently deflectable axially but are sufficiently stiff to axially bias the bellows flange 97 inwardly in the direction of the seal rings 15 and 16. The bellows flange 97 is sealingly connected to the stationary seal ring 16 in order to support the seal ring 16 and axially bias the seal ring into sealing engagement with the opposing rotatable seal ring 15.

Referring to FIGS. 1 and 2, with the above-described arrangement, the seal ring 16 is non-rotatably supported on the seal housing 80 while the opposing seal ring 15 is rotatably supported on the shaft 12 so as to rotate in unison therewith. When the shaft 12 is not rotating, the opposing seal faces 24 and 25 (FIG. 2) are disposed in sealing relation to prevent migration of the fluid 20 radially inwardly across the sealing region 26. During shaft rotation, the spring loading of the seal ring 16 (FIG. 1) by the bellows assembly 91 permits the seal ring 16 to be displaced axially away from the seal face to allow for the formation of a fluid film therebetween.

More particularly as to the seal ring 16, the seal ring 16 preferably is formed of a silicon carbide seal material. The seal ring 16 further includes grooves 100 which are spaced circumferentially on the outside diameter thereof and slidably engage the ribs 83 (FIG. 1) on the seal housing 80, to prevent rotation of the seal ring 16 during rotation of the opposed seal ring 15 with the shaft 12 (FIG. 1).

As described hereinafter, the bellows flange 97 (FIG. 1) is non-rotatably connected to the seal ring 16 by a bellows gasket 125, which said bellows gasket 125 is formed identical to the rotating seal ring gasket 65 and the seat gasket 87.

Referring to FIG. 2, the bellows gasket 101 is C-shaped or U-shaped which shape is defined by a radial gasket wall or end wall 102 and upper and lower gasket legs 103 and 104 which extend axially away from the gasket wall 102. The upper and lower legs 103 and 104 are generally parallel to each other but in radially spaced relation to thereby define a gasket slot 105 which opens axially therefrom.

Additionally, an annular gasket spring 106 is fitted into the gasket slot 105 to press the upper and lower gasket legs 103 and 104 radially apart. Normally, as illustrated in FIG. 2, the spring 106 has its upper and lower spring legs deflected in compression so as to press the respective gasket legs 103 and 104 radially away from each other into contact with the seal ring 16 and bellows flange 97. The resiliency of the gasket 101 and the spring 106 serves to center the seal ring 16, and also serves to dampen bellows vibrations.

In addition to the radial resiliency, the gasket 101 also provides axial load support so that the axial load of the bellows flange 97 is transmitted to the stationary seal ring 16. In particular, the same as the gaskets 65 and 87 (FIG. 1), the lower gasket leg 104 is confined axially. Thus, as the bellows flange 97 is biased axially towards the seal ring 16, this axial load is transmitted axially to the seal ring 16 through the lower gasket leg 104.

The following discussion is specifically directed to the gasket 65 or 101, it being understood that all of the gaskets 65, 101 and 87 have the identical construction. As generally seen in FIG. 2, the cross section of the gasket 65 has a U-shape defined by multiple layers of graphite ribbon material. An example of such graphite ribbon material is sold under the trademark GRAFOIL™. The graphite gasket is essentially formed of two sections of ribbon material comprising an L-shaped gasket section 110 and a second overwrap gasket section 111 of ribbon overwraps which are wrapped circumferentially about the L-shaped section. Additionally, the U-shaped cross section illustrated in FIG. 2 is formed through shaping of the graphite material, preferably by a pressing die.

Referring to FIGS. 3 and 4, the L-shaped section 110 is defined by at least one annular length of wide graphite ribbon 112 which is relatively thin in the radial direction and relatively wide in the axial direction. The wide ribbon 112 has a circumferential length which preferably overlaps at the free ends 113 and 114 thereof. In the first step of the invention, this initial length of ribbon material essentially defines a starter wrap identified by reference numeral 115 which in its initial condition has the opposite wide faces 117 and 118 thereof facing in opposite radial directions.

Once this starter wrap 115 is formed, the starter wrap 115 is inserted into a forming fixture 120. The forming fixture 120 includes a cylindrical inner plug 121 and an outer cylinder 122 having a bore 123 therein within which the inner plug 121 is received. The outer cylinder 122 includes a relatively thin and deep axial channel 124 which opens radially inwardly towards the inner plug 121 and also opens axially upwardly. The bottom end of the groove 124 is defined by an end wall 125. The outer cylinder 122 further includes an annular radial channel 126 which essentially communicates with the axial channel 124.

As illustrated in FIGS. 4–6, the starter wrap 115 is then formed into an L-shaped ribbon wrap 130. Specifically, the starter wrap 115 is inserted axially into the axial channel 124 of the forming fixture 120 and then the outwardly projecting portion of the starter wrap 115 is folded radially outwardly into the radial channel 126 to thereby define an L-shaped cross section for the L-shaped wrap 130. Preferably, the starter wrap 115 is manually folded outwardly by pressing with a finger or other forming device to form the radial ribbon section 132. The L-shaped wrap 130 has an L-shaped cross section defined by an axial ribbon section 131 and a radial ribbon section 132 which projects radially outwardly therefrom. As seen in FIG. 6, the free ends 113 and 114 of this ribbon material still are adapted to overlap to a limited extent.

The axial ribbon section is defined by an inward facing circumferential surface 133 and an outward facing circumferential surface 134 while the radial ribbon section 132 defines an end face 136 and an interior face 137 which both face axially.

Next, a die-forming mandrel 140 is provided, on which the L-shaped wrap 130 is positioned for further manufacturing steps to ultimately construct the gasket. The mandrel 140 includes several diametrically decreasing sections comprising an adapter 141 at the bottom end thereof which includes an end face 142 which faces upwardly. The adapter 141 transitions into a support section 143 which has a smaller diameter than the adapter 141 and defines an upward facing support surface 144. Further, the support section 143 then transitions into a cylindrical shaft 146 which projects upwardly from the support surface 144 and defines an outer circumferential shaft surface 147.

Figure 7:
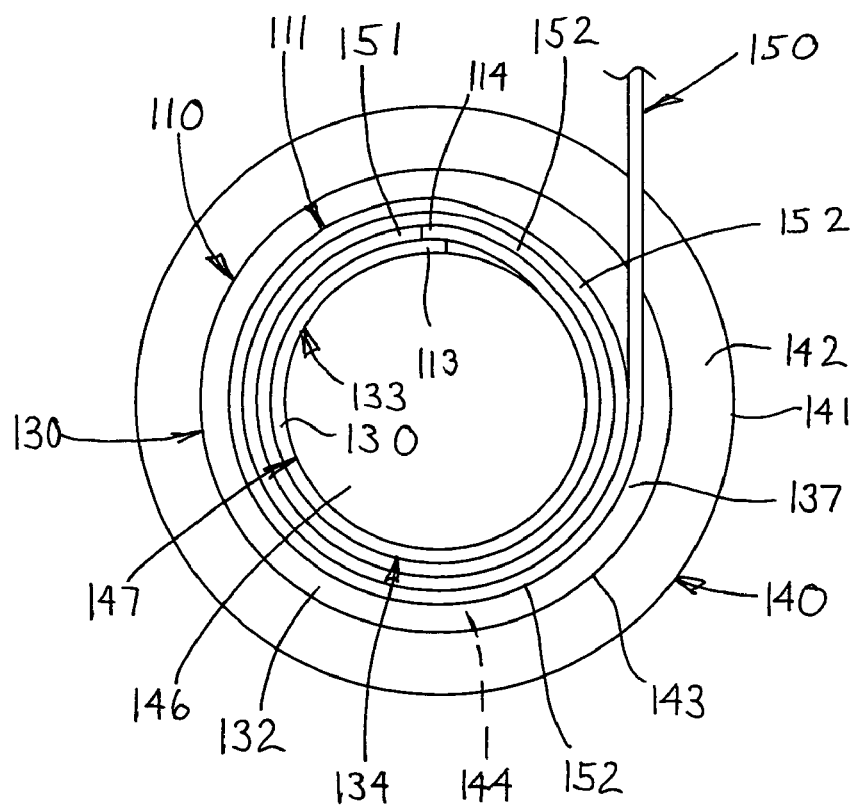
FIG. 7 is a plan view of graphite ribbon overwraps being applied to the L-shaped wrap to define an intermediate graphite ring.

In the next step, one free end 113 of the L-shaped section 130 is positioned on the support surface 144 with the radial ribbon section 132 being supported on the support surface 144. The axial ribbon section 131 projects upwardly and lies flat against the outer shaft surface 147 so that the L-shaped ribbon section 130 conforms to the cylindrical or circular shape of the shaft 146. The opposite free end 114 of the L-shaped section is then wrapped about the outer circumferential shaft surface 147 until the free end 114 overlaps the starting free end 113 as generally illustrated in FIG. 7. To secure the free ends 113 and 114 together, a suitable adhesive is applied to the outside face of the starting free end 113 such that the overlapped free ends 113 and 114 are then adhered together in a closed loop.

Referring to FIG. 7, the overwrap section 111 is then applied to this L-shaped wrap 130 which said L-shaped section 130 defines the L-shaped gasket section 110 of the gasket 65 (87, 101). The overwrap section 111 is defined by a continuous length of grafoil or graphite ribbon material 150 which is supplied from a spool or the like and wrapped multiple times about the axial ribbon section 131. In particular, the graphite ribbon 150 has a width which is proximate the axial width of the axial ribbon section 131 but is smaller relative thereto so that the multiple wraps of ribbon material 150 when combined with the L-shaped section 130 essentially have a constant axial width across the radial thickness of the gasket. This width of ribbon 150 does not need to be exactly the same as axial ribbon section 131, but can be somewhat longer or shorter depending on the desired volume and the finished pressed dimension of the final gasket shape.

Figure 8:
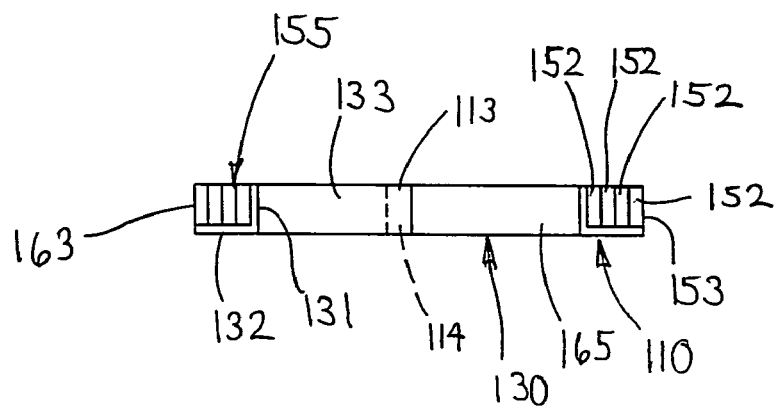
FIG. 8 is a side cross-sectional view of the intermediate ring without the mandrel.

More particularly, the ribbon 150 has a free end 151 which is positioned against the outer circumferential surface 134 of the axial ribbon section 131 and is secured in place thereon by adhesive. Preferably, the free end 151 abuts circumferentially against the end face of the wrap end 114 wherein the butting ends 151 and 114 essentially lie flush to each other. As seen in FIG. 7, the ribbon 150 is then wrapped circumferentially about the axial ribbon section 131 to define multiple axial layers or overwraps 152 of ribbon material which circumferentially overlie the axial ribbon section 131. Preferably, four overwraps 152 are provided as generally illustrated in FIG. 8 wherein the interior end faces 153 of the overwraps 152 abut against the opposing interior face 137 of the radial ribbon section 132. Additional adhesive is provided to the free end of the ribbon material 150 to thereby secure the multiple overwraps 152 and prevent unwinding thereof prior to the pressing operation described hereinafter. Although the gasket described herein has four overwraps 152, larger gasket cross-sections could be easily designed with larger graphite ribbon volume and larger springs.

Figure 9:
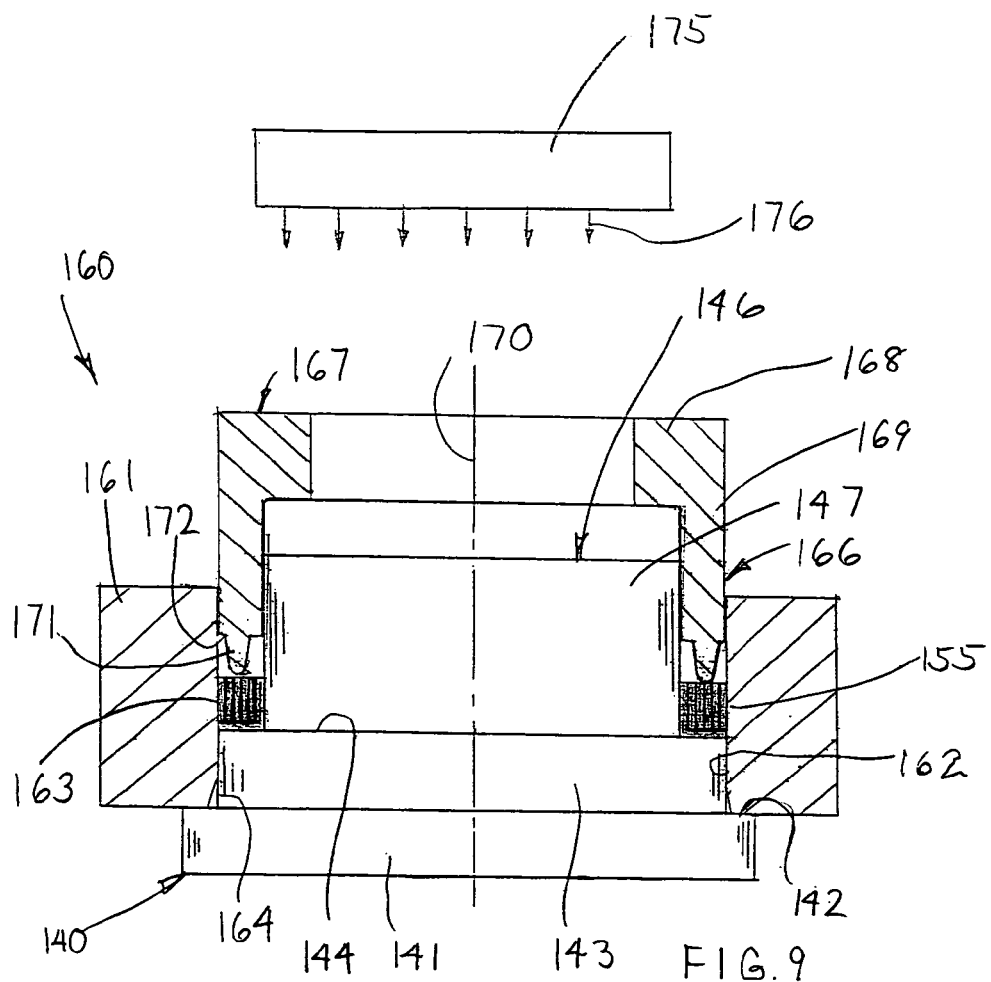
FIG. 9 illustrates the intermediate ring on the mandrel as positioned within a pressing die.
Figure 10:
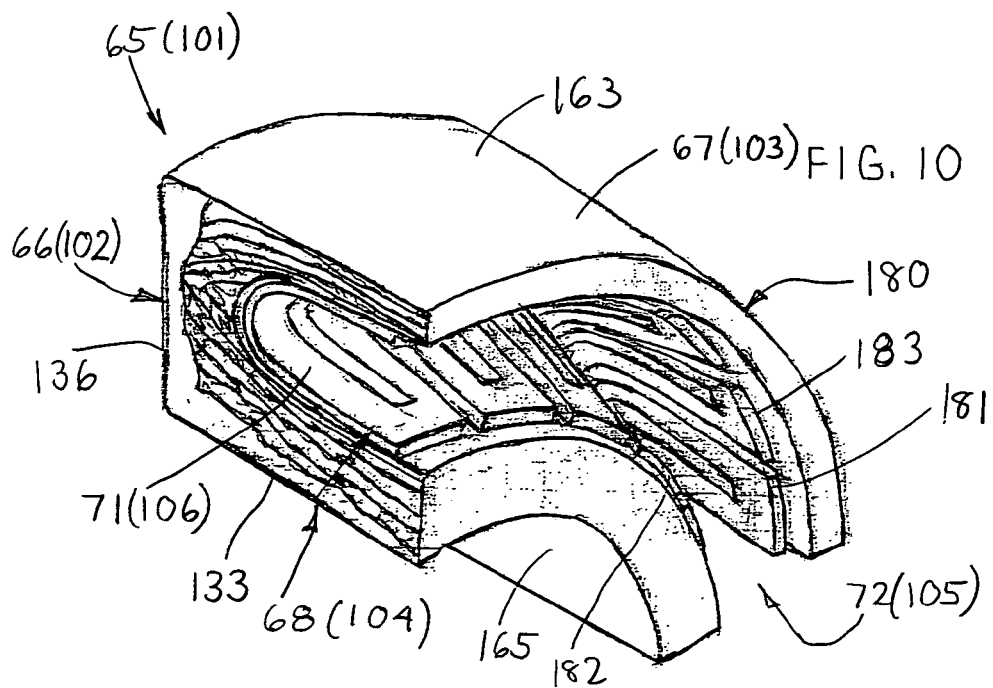
FIG. 10 is a partial perspective view of a die-formed graphite gasket with a spring disposed therein.

Referring to FIGS. 8 and 9, the combination of the L-shaped ribbon section 130 and the overwrap section 111 defines an intermediate graphite ring 155 which essentially has a square or rectangular cross section as seen in FIG. 8. This intermediate graphite ring 155 remains positioned on the mandrel shaft 146 and then the mandrel 141 is positioned for use with a hydraulic die press unit 160.

The die press unit 160 comprises an outer ring 161 having an interior bore 162 into which the mandrel support section 143 fits. The outer circumferential surface 163 of the intermediate graphite ring 155 therefore lies against the inside face 164 of the bore 162 while at the opposite inner cylindrical surface 165 of the graphite ring 155 remains in contact with the circumferential shaft surface 147.

On the upper end of the die press, the bore 162 essentially defines an annular channel 166 into which a forming ring 167 is slidably fitted. The forming ring 167 has an end wall 168 and an annular side wall 169 which extends circumferentially about a central axis 170. The lower end of the forming ring 167 is provided with a forming rib 171 which projects axially downwardly from an end face 172 of the ring wall 169. The ring end face 172 closes off the radial width of the channel 166 while the forming rib 171 is adapted to be pressed downwardly into the interior of the intermediate graphite ring 155 to form the annular interior channel 72 (105).

A hydraulic press 175 is provided which moves downwardly in the direction of reference arrows 176 to press against the forming ring 167 and drive the forming rib 171 downwardly so as to be embedded within the graphite material and form the U-shaped cross section of the gasket 65 (101, 87).

Preferably, the intermediate graphite gasket 155 is compressed to approximately 14,000–20,000 psi during the pressing operation to not only shape the intermediate graphite ring 155 but also increase the density of the graphite material to the maximum density thereof. The intermediate graphite ring 155 thereby conforms to the shape of the cavity defined by the mandrel support surface 144, the circumferential shaft surface 147, the cylinder bore surface 164 and the forming ring end surface 172 and forming rib 171. It will be understood that these surfaces may be varied if desired to modify the cross-sectional shape of the gaskets referenced above.

The formed graphite is then removed from the die press 160 and is in the form of a graphite ring 180 having a U-shaped cross section. This U-shaped cross section includes the annular channel 72 (105) wherein this channel preferably narrows in the interior direction and has a full radius at the interior end of the channel.

The gasket ring 180 is then provided with the interior spring 71 (106) to thereby form the self energized gasket 65 (101, 87). This spring 71 (106) preferably is a conventional annular spring defined by circumferentially adjacent but slightly spaced apart U-shaped spring fingers 181. The spring 71 thereby has radially inner legs 182 and radially outer spring legs 183 which press in opposite radial directions to bias the respective inner gasket leg 68 and outer gasket leg 67 inwardly and outwardly to provide an improved seal in accord with the disclosure of the present invention. It is noted that the inner gasket leg 68 (104) may have a greater radial thickness than the outer gasket leg 67 (103) as illustrated but may also have the same radial thickness depending upon the radial position of the channel 72 (105) relative to the inner and outer gasket legs.

In accord with the foregoing, the gasket 65, 101, 87 has a graphite construction which is particularly suitable for higher temperature applications and hence, known PDFE gaskets may be replaced with these graphite gaskets where the mechanical seal 10 is used in higher temperature applications.

The construction of the seal provides advantages in that the L-shaped section extends axially and radially, continuously without joints to define a barrier extending along the inner circumferential surface 133 and the gasket end wall 66 (102) and thereby impede undesirable migration of process fluid in the event that such fluid is able to penetrate between the axial overwraps 152. Structurally, the graphite gasket 65 is formed of an L-shaped ribbon section 110 along with an overwrap section 111 having additional axial ribbon overwraps 152 which gasket is then die formed to have a U-shaped cross section.

As to the manufacturing process, this process generally comprises the steps of forming a starter wrap of wide ribbon material and forming this starter ring into an L-shaped wrap of graphite ribbon. This L-shaped ribbon section 130 is positioned on a mandrel 140 with the free ends 113 and 114 adhered together. Thereafter, multiple overwraps 152 of ribbon 150 are provided circumferentially about the axial ribbon section 131 to define an intermediate graphite ring 155.

Further, this graphite ring, still mounted to the mandrel 140, is then die formed in a die press so as to have a U-shaped cross section. After which, a spring 71 (106) is inserted into an interior channel formed within the gasket ring 180. The spring 71(106) may or may not be spot bonded in position within the channel to maintain the spring therein.

As a result, this forming process provides for the formation of a gasket with a non-square or non-rectangular cross section which is shaped to have a U-shaped cross section. This process allows for the formation of this U-shaped cross-section through the use of conventional graphite ribbon.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. In an annular secondary seal gasket for a mechanical seal, said gasket having inner and outer circumferential surfaces extending circumferentially about a center axis and axially parallel to said axis, and further having opposite closed and grooved end faces which extend radially and face in opposite axial directions, said gasket including a groove opening through said grooved end face to define radially spaced apart inner and outer gasket legs such that said gasket has a U-shaped cross sectional shape, an interior biasing unit being disposed in said groove to bias said gasket legs radially, comprising the improvement wherein said gasket is formed of graphite, said gasket comprising an L-shaped gasket section formed of first graphite ribbon which is annular, said L-shaped gasket section having an L-shaped cross section defined by an axial ribbon section and a radial ribbon section extending radially from said axial ribbon section, said gasket further comprising an overwrap gasket section formed of second graphite ribbon which comprises a plurality of wraps of graphite ribbon wrapped circumferentially about said axial ribbon section, said groove extending axially into said overwrap gasket section.

2. The gasket according to claim 1, wherein said axial ribbon section defines said inner circumferential surface.

3. The gasket according to claim 2, wherein said radial ribbon section defines said closed end face.

4. The gasket according to claim 1, wherein said axial ribbon section extends along said inner gasket leg.

5. The gasket according to claim 1, wherein said U-shaped cross section of said gasket is die-formed such that said groove is formed in said overwrap gasket section.

6. The gasket according to claim 1, wherein said first graphite ribbon has a first width and said second graphite ribbon has a second width less than said first width such that said second width is proximate the axial length of said axial ribbon section.

7. An annular secondary seal gasket for a seal having a U-shaped cross section defined by radially spaced apart, inner and outer gasket legs, a gasket end wall extending radially between said inner and outer gasket legs, and a groove defined between said gasket legs which opens axially from an end of said gasket opposite said end wall, said gasket comprising:
an L-shaped gasket section formed of first graphite ribbon which is annular, said L-shaped gasket section having an L-shaped cross section defined by an axial ribbon section extending along said inner gasket leg and a radial ribbon section extending radially from said axial ribbon section across said gasket end wall; and
an overwrap gasket section formed of second graphite ribbon which comprises a plurality of wraps of graphite ribbon wrapped circumferentially about said axial ribbon section, said groove extending axially into said overwrap gasket section.

8. The gasket according to claim 7, wherein said axial ribbon section defines an inner circumferential surface of said gasket.

9. The gasket according to claim 7, wherein said U-shaped cross section of said gasket is die-formed such that said groove is formed in said overwrap gasket section.

10. The gasket according to claim 7, wherein said first graphite ribbon has a first ribbon width and said second graphite ribbon has a second ribbon width less than said first ribbon width such that said. second ribbon width is proximate the axial length of said axial ribbon section.

11. The gasket according to claim 10, wherein the number of said wraps in said overwrap section defines a radial width which is proximate the radial dimension of said radial gasket section.

12. The gasket according to claim 11, wherein said first ribbon width equals the axial length of said axial ribbon section and said radial dimension of said radial gasket section.

13. In an annular secondary seal gasket for a mechanical seal, said gasket having inner and outer circumferential surfaces extending circumferentially about a center gasket axis, and further having opposite end faces which extend radially and face in opposite axial directions, comprising the improvement wherein said gasket comprises a one-piece L-shaped gasket section formed of first ribbon made of a flexible seal material, and a wrapped gasket section formed of second ribbon made of a flexible seal material, said L-shaped gasket section having a cross-section defined by an axial ribbon section and a radial ribbon section extending radially from said axial ribbon section as one-piece wherein said radial ribbon section and said axial ribbon section define a joint-free corner therebetween, said wrapped gasket section comprising a plurality of wraps of said second ribbon which are wrapped circumferentially in multiple layers to define radially facing inner and outer circumferential surfaces, said axial ribbon section of said L-shaped gasket section being disposed in contacting, radially-facing relation with one of said circumferential surfaces of said wrapped gasket section wherein said radial ribbon section of said L-shaped gasket section covers an end edge region of said wrapped gasket section to prevent leakage of fluid between said layers of said wrapped gasket section.

14. The gasket according to claim 13, wherein said axial ribbon section defines said inner circumferential surface of said gasket and said radial ribbon section extends radially outwardly and defines one of said end faces of said gasket.

15. In an annular secondary seal gasket for a mechanical seal, said gasket having inner and outer circumferential surfaces extending circumferentially about a center gasket axis, and further having opposite end faces which extend radially and face in opposite axial directions, comprising the improvement wherein said gasket comprises an L-shaped gasket section formed of first ribbon made of a flexible seal material, and a wrapped gasket section formed of second ribbon made of a flexible seal material, said L-shaped gasket section having a cross-section defined by an axial ribbon section and a radial ribbon section extending radially from said axial ribbon section, said wrapped gasket section comprising a plurality of wraps of said second ribbon which are wrapped circumferentially in multiple layers to define radially facing inner and outer circumferential surfaces, said axial ribbon section of said L-shaped gasket section being disposed in contacting, radially-facing relation with one of said circumferential surfaces of said wrapped gasket section wherein said radial ribbon section of said L-shaped gasket section covers an end edge region of said wrapped gasket section to prevent leakage of fluid between said layers of said wrapped gasket section, wherein said gasket has a U-shaped cross-section which is die-formed to define an axially-opening end groove that is formed in said wrapped gasket section.

16. The gasket according to claim 13, wherein said first ribbon has a first width and said second ribbon has a second width less than said first width such that said second width is proximate the axial length of said axial ribbon section.

17. The gasket according to claim 13, wherein said flexible seal material of said first ribbon and/or said second ribbon is graphite.

18. In an annular secondary seal gasket for a sealing device, said gasket having inner and outer circumferential surfaces extending circumferentially about a center gasket axis, and further having opposite end faces which extend radially and face in opposite axial directions, comprising the improvement wherein said gasket comprises an annular L-shaped gasket section formed of first ribbon made of a flexible seal material, and an annular wrapped gasket section formed of second ribbon made of a flexible seal material, said L-shaped gasket section having a one-piece cross-section defined by an axial ribbon section formed together as a single piece with a radial ribbon section extending radially from said axial ribbon section wherein said radial ribbon section and said axial ribbon section define a joint-free corner therebetween, said wrapped gasket section comprising a plurality of superimposed layers of said second ribbon which face radially and extend circumferentially with said layers wrapped one about the other to define radially facing inner and outer circumferential surfaces for said wrapped gasket section, said axial ribbon section of said L-shaped gasket section being disposed in contacting, radially-facing relation with one of said circumferential surfaces of said wrapped gasket section wherein said radial ribbon section of said L-shaped gasket section covers an end edge region of said wrapped gasket section to prevent leakage of fluid between said layers of said wrapped gasket section.

19. The gasket according to claim 18, wherein said axial ribbon section defines said inner circumferential surface of said gasket and said radial ribbon section extends radially outwardly and defines one of said end faces of said gasket.

20. In an annular secondary seal gasket for a sealing device, said gasket having inner and outer circumferential surfaces extending circumferentially about a center gasket axis, and further having opposite end faces which extend radially and face in opposite axial directions, comprising the improvement wherein said gasket comprises an annular L-shaped gasket section formed of first ribbon made of a flexible seal material, and an annular wrapped gasket section formed of second ribbon made of a flexible seal material, said L-shaped gasket section having a cross-section defined by an axial ribbon section and a radial ribbon section extending radially from said axial ribbon section, said wrapped gasket section comprising a plurality of superimposed layers of said second ribbon which face radially and extend circumferentially with said layers wrapped one about the other to define radially facing inner and outer circumferential surfaces for said wrapped gasket section, said axial ribbon section of said L-shaped gasket section being disposed in contacting, radially-facing relation with one of said circumferential surfaces of said wrapped gasket section wherein said radial ribbon section of said L-shaped gasket section covers an end edge region of said wrapped gasket section to prevent leakage of fluid between said layers of said wrapped gasket section, wherein said gasket has a U-shaped cross-section which is die-formed to define an axially-opening end groove that is formed in said wrapped gasket section.

21. The gasket according to claim 20, wherein said end groove is bounded by inner and outer gasket legs, and a resilient biasing member is disposed in said end groove and biases said inner and outer gasket legs radially away from each other.

22. The gasket according to claim 21, wherein each of said inner and outer gasket legs is defined by a plurality of said layers.

23. The gasket according to claim 18, wherein said first ribbon has a first width and said second ribbon has a second width less than said first width such that said second width is proximate the axial length of said axial ribbon section.

24. The gasket according to claim 18, wherein said radial ribbon section has a radial length which is substantially the same as a radial thickness of said wrapped gasket section.

25. The gasket according to claim 18, wherein said flexible seal material of said first ribbon and/or said second ribbon is graphite.

26. The gasket according to claim 18, wherein said layers of said wrapped gasket section are defined by a continuous length of said second ribbon which is spirally wound about said axial ribbon section.

27. The gasket according to claim 18, wherein said first ribbon is folded into an L-shape to define said axial and radial ribbon sections.

28. The gasket according to claim 27, wherein opposite ends of said first ribbon are adhered together by an adhesive.

29. The gasket according to claim 18, wherein said layers of said wrapped gasket section are tightly wrapped about said axial ribbon section.

30. The gasket according to claim 18, wherein said L-shaped gasket section and said wrapped gasket section are compressed together to each have a final density which is greater than an initial density of each of said first ribbon and said second ribbon.

31. In an annular secondary seal gasket for a mechanical seal, the gasket having inner and outer circumferential surfaces extending circumferentially about a center axis and axially parallel to said axis, and further having opposed closed and grooved end faces which extend radially and face in opposite axial directions, the gasket further having a groove opening through said grooved end face to define radially spaced apart inner and outer gasket legs such that said gasket has a U-shaped cross sectional shape, the gasket further comprising the improvement:
   wherein the gasket is formed of graphite,
   wherein the gasket comprises an L-shaped gasket section formed of first graphite ribbon that is annular, the L-shaped gasket section having an L-shaped cross section defined by an axial ribbon portion and a radial ribbon portion extending radially from and being unitarily formed together with the axial ribbon portion,
   wherein the gasket further comprises an overwrap gasket section formed of second graphite ribbon which comprises a plurality of wraps of graphite ribbon wrapped circumferentially about the axial ribbon portion of the L-shaped gasket section, and
   wherein the groove extends axially into the overwrap gasket section.

32. The gasket according to claim 15, wherein said L-shaped gasket section has a one-piece cross-section, said axial ribbon section and said radial ribbon section being formed together as a single piece.

33. The gasket according to claim 32, wherein said first ribbon is a one-piece ribbon folded in said L-shaped to define said axial and radial ribbon sections.

34. The gasket according to claim 18, wherein said first ribbon is a one-piece ribbon folded in said L-shape to define said axial and radial ribbon sections and said corner therebetween.

* * * * *